July 7, 1970 K. VOCKENHUBER ET AL 3,519,340
CINEMATOGRAPHIC EQUIPMENT, ESPECIALLY A SUBSTANDARD
FORMAT FILM CAMERA
Filed Dec. 6, 1967 2 Sheets-Sheet 1

United States Patent Office 3,519,340
Patented July 7, 1970

3,519,340
CINEMATOGRAPHIC EQUIPMENT, ESPECIALLY A SUBSTANDARD FORMAT FILM CAMERA
Karl Vockenhuber and Josef Drasch, Vienna, Austria; said Drasch assignor to Raimund Hauser, Vienna, Austria
Filed Dec. 6, 1967, Ser. No. 688,614
Claims priority, application Austria, Jan. 19, 1967, A 583/67
Int. Cl. G03b 23/02
U.S. Cl. 352—72          10 Claims

ABSTRACT OF THE DISCLOSURE

A cartridge type motion picture camera has a film driving mechanism for driving the film in the cartridge and a release mechanism for controlling the film driving mechanism. An impulse transmitting device is periodically operated in response to motion of the film in the cartridge. An electric circuit includes a switch which operates in response to energization of the circuit by the release mechanism when the driving mechanism is released. The circuit has a condenser and signal device and alternating current transmitting components connecting the impulse transmitting device with the circuit. The alternating current impulses given by the impulse transmitting device change the value of the charge on the condenser in the rhythm of the pulses, thereby varying the voltage on the condenser in dependence on the impulse frequency. The signal device is controlled by the voltage on the condenser and releases a signal when the voltage differs from the preset voltage range due to the impulse frequency falling below a minimum frequency.

---

Figure 1:
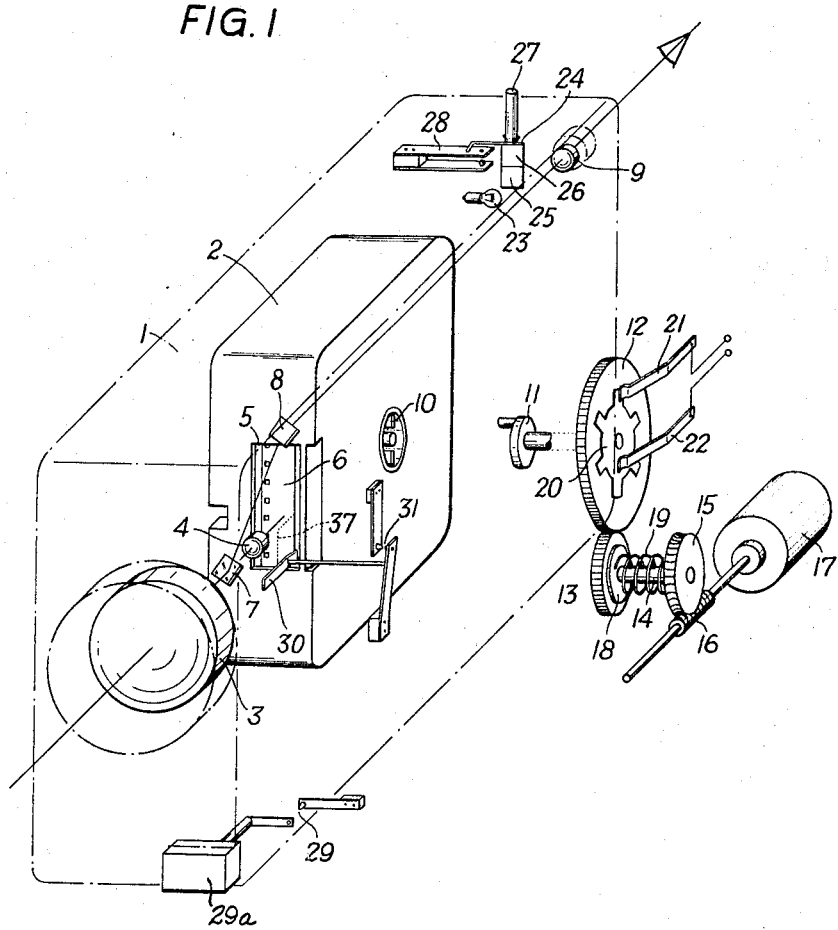

The present invention relates to cinematographic equipment, in general, and to a substandard format film camera for film arranged in a cartridge, and provided with means for the discovery of jamming in the film transport means, in particular.

In substandard format film cameras for film arranged in cartridges disturbances occur sometimes because the film jams in the cartridge and the power requirement necessary for the film transport in a short time reaches a multiple of the normal power requirement. In such a case the maximum moment of the friction clutch coupling provided in the drive of the take up reel of the cartridge is exceeded by far, so that the friction clutch coupling slips. Simultaneously the claw is pushed out of the perforations in the film, so that a drive does not take place from this side. In this case the amateur will generally not become aware of the disturbance in the film transport, particularly because most of the used film counters are controlled by the camera gear and although the film stands still it will indicate that the film is moving.

According to a known suggestion the camera is provided with a signaling disk, which is directly driven by the ratchet wheel operating the take up reel of the cartridge. This signaling disk bears radially running lines on its front side, which are visible through a window on the surface of the camera. During normal functioning this signaling disk rotates, but it stands still when the film jams. The disadvantage of this arrangement is, that the amateur has to watch it continually and in case of jamming no appropriate signal is given. In spite of this arrangement it is therefore possible that a disturbance is only discovered relatively late, which is annoying when the shots which were taken cannot be repeated.

It is an object of the present invention to provide an impulse transmitter by which the above mentioned disadvantage is avoided and operated by the drive of the take up reel or directly by the motion of the film, respectively, and which is connected by alternating current conducting means with a control circuit, which is switched on simultaneously upon starting the film drive and which contains a capacitor that, as is well known, is loaded and unloaded, respectively, in the rhythm of the impulses given the impulse transmitter, whereby for instance, an optical or acoustical signal is released by the control circuit when the impulses provided by the impulse transmitter fall below a minimum frequency and therewith the voltage developing at a capacitor falls below or exceeds a predetermined threshold value.

According to the novel arrangement the user's attention is immediately drawn to the defect by means of a positive signal, which appears when the film transport jams. The signal may be given acoustically or optically. In the latter case it is advisable to locate the optical signaling device in the viewfinder of the camera.

It is another object of the present invention to provide a voltmeter device, which is connected with the battery of the camera drive and which inserts an additional resistance in the loading, respectively, unloading the circuit when the battery voltage falls below the minimum voltage of operation. By this, the time constant of this circuit is reduced so much that the voltage at the capacitor fluctuates with the rhythm of the impulses derived from the impulse transmitter and a periodical signal is emitted by the circuit. By this measure it is obtained that the amateur is directed towards another cause of disturbance, namely an unreasonable falling off of the voltage of the battery of the driving motor of the camera. As is well known, falling below the minimum operating voltage involves a fall off of the image frequency and with it an overexposure of the particular image as well as a certain time lapse effect at the performance. Contrary to the case with transport jamming, of course further shots are possible in this case though of some reduced quality. Since in the one case a continuous, and in the other case an intermittent, signal appears, the cause of disturbance is easily recognized.

Figure 2:
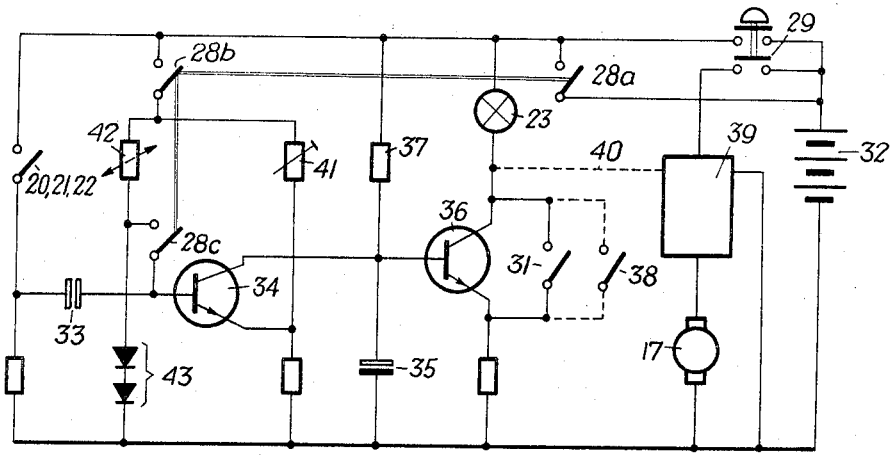
Figure 3:
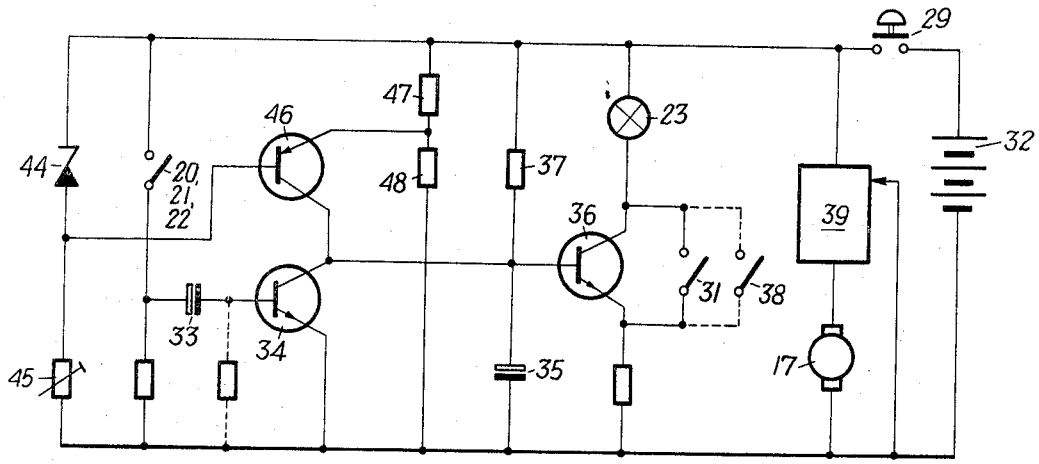

With these and other objects in view, which will become apparent in the following detailed description, the present invention will be clearly understood in connection with the accompanying drawings, in which:

FIG. 1 is a schematic perspective view of a substandard format film camera designed to receive Super 8 cartridges, in which all parts which are not essential for the invention have been omitted; FIG. 2 is a circuit diagram of the camera represented in FIG. 1; FIG. 3 illustrates a circuit diagram of a modified embodiment.

Referring now to the drawings and more particularly to FIG. 1, a housing 1 of a Super 8 substandard format designed in accordance with the present invention contains a film cartridge 2. By means of an optical system 3 and 4 an image of the objective is projected on the film 6 disposed free in the cartridge gate 5. By means of a partially permeable mirror 7 disposed in the path of the rays of the objective, a part of the incident light from the objective is reflected towards a viewfinder system, which comprises a further mirror 8 and an eyepiece 9. For the sake of clarity the objective diaphragm, the shutter and the claw of the film transport means with the corresponding drive devices have been omitted from the drawings. The film 6 is transported step by step in the range of the cartridge gate 5 by means of the claw (not shown) and is coiled up on a take-up reel arranged in the interior of the cartridge, which take-up reel is operatively connected to a coupling piece 10. The coupling piece 10 cooperates with a catch 11 of the camera, which catch is arranged on the shaft of a gear wheel 12.

This gear wheel is driven by a pinion 13, which is rotatably arranged on the shaft 14 of the worm gear 15. The worm gear 15 mates with the worm 16 on the shaft of the camera motor 17. For balancing the different roller diameters of the take-up reel in the cartridge 2, a friction clutch coupling is provided between the worm gear 15 and the pinion 13; this friction clutch coupling comprises a friction disk 18 abutting the pinion 13, and a spring 19. In order to provide exact steadiness of the frame during film recording, the friction clutch coupling 18, 19 is adjusted in a way such as to unroll only the film quantity that is transported by the claw in the range of the cartridge gate. The moment defined by the friction clutch coupling 18, 19 should therefore not reach too high a value, so that the friction of the film 6 in the cartridge gate 5 is overcome. One plane side of the gear wheel 12 is coated with an essentially star-shaped contact disk 20 on which rub brushes 21 and 22 are provided. The parts 20, 21 and 22 form an electric switch, which, upon rotation of the gear wheel 12 sends out impulses.

A signaling lamp 23 is arranged in the path of the rays of the viewfinder. Between the viewfinder-eyepiece and the signaling lamp 23 is a filter disk 24 having a red-colored zone 25 and a green-colored zone 26. The filter disk 24 is adjustable by a key 27, which simultaneously operates a switch 28. A camera release 29a is provided and a key 30 laterally abutting the film 6, which key 30 operates a switch 31 by means of a pin.

The mode of operation of the novel arrangement is set forth in the following according to the circuit diagram illustrated in FIG. 2. By means of the camera release switch 29, the camera motor 17 and the switch 20, 21, 22 is connected with the battery 32. The motor 17 drives the gear wheel by means of the friction clutch 18, 19 in a disturbance-free operation. Impulses are given by the switch 20, 21, 22, which is controlled by this gear wheel. These impulses are capacitatively transmitted by means of a condenser 33 to the basis of the NPN transistor 34. Upon the arrival of an impulse, the transistor 34 becomes conductive and is thus bridged across the condenser 35 by means of which it is unloaded. The condenser 35 is connected in the base-emitting-circuit of NPN transistor 36 and is constantly loaded by the battery by means of a loading resistor 37. The time constant of the RC circuit consisting of condenser 35 and resistor 37 is chosen such that at the minimum frequency of the switch 20, 21, 22 occurring with normal operation (maximum roller diameter of the take up reel in the cartridge 2) the condenser 35 is always unloaded to such an extent that the transistor 36 remains locked. As soon as a jamming in the film transport occurs, the moment at the coupling 10 of the film cartridge 2 rises so much that the friction clutch coupling 18, 19 slips and the gear wheel 12 is stopped. Consequently, the impulses at the base of the transistor 34 fail to arrive and the transistor therefore remains locked. The voltage at the condenser 35 increases to such as extent that the transistor 36 becomes conductive and causes a signaling lamp arranged in the collector circuit to light up. Parallel to the transistor 36 the switch 31 is provided, which switch is operated by the key 30 resting on the film edge. The film end of Super 8 films has a lateral notch 37. As soon as it enters the cartridge gate 5, the key 30 falls into the notch and closes the switch 31, so that the lamp also lights up after a runoff of the entire length of the film. The jamming signal also appears when the camera is released and there is no cartridge 2 in the camera.

Parallel to the switch 31 some additional switches 38 may be provided, which are actuated in case of a jamming or defective readiness in the operation. So for instance, the switch 38 may be energized by an exposure control device causing the signaling lamp 23 to light up when the lighting of the scene is insufficient. The switch 38 may also be controlled by other equipment cooperating with the camera, for instance by a tape recorder or lighting device and thus may indicate a defeat in the readiness of operation or any disturbance in the equipment.

An electronic speed regulating device 39 is arranged in series with the camera motor, which speed regulating device controls the voltage of the motor terminals dependent on the feeding voltage and the drawn current.

In a further embodiment of the invention a blocking voltage is inserted in the speed regulating device 39 by means of a main 40 when the transistor opens, thus causing the camera motor to be removed from the circuit. Since in this case the camera drive is interrupted when a jamming of the film transport occurs, a signaling device could be omitted.

In order to be able to determine prior to filming, whether the camera is ready for operation, that is, especially whether the voltage of the battery 32 is sufficient to reach the nominal frame frequency, the circuit can be connected with a voltmeter circuit by means of a switch 28. The contact 28a of the switch 28 is bridged across the camera release switch 29. By means of the contact 28b an adjustable resistor 41 and a voltage divider 42, 43 are inserted. A voltage depending resistor 43 is provided constituting in this embodiment, two diodes. With the same success, Zener diodes may be used. The resistor 42 is temperature dependent and compensates the influence of temperature on the circuit. By the contact 28c the central tapping of the voltage divider 42, 43 is connected with the transistor 34. If the voltage 32 exceed a threshold value adjusted by the resistor 41, the transistor 34 locks. The voltage at the condenser 35 therefore adopts its maximum value and as a result the transistor 36 opens and the lamp 23 lights up.

For the voltage control a circuit was designed, which with a voltage exceeding the minimum voltage of operation, brings about a positive signal, that is, the lighting up of a lamp, since with a complete breakdown of the battery such a signal would not be possible. In order to clearly distinguish the voltage control signal indicating readiness of the operation of the equipment from a disturbance signal, the red filter 25, which is normally connected in series to the signaling lamp, is swung out by means of the control key 27 along with simultaneous operation of the contacts 28a to 28c and a green filter 26 is swung between the signaling lamp 23 and the ocular 9.

The arrangement illustrated in FIG. 3 is a circuit diagram which differs from the arrangement described above especially with respect to the kind of voltage control. Parallel to the terminals of the battery 32 a Zener diode 44 and an adjustable resistor 45 are located. The central tapping of the voltage depending divider formed by the Zener diode 44 and the resistor 45, is connected with the base of a PNP transistor 46, the collector of which is connected with the collector of the transistor 34. The emitter of the transistor 46 is connected with one terminal of the battery 32 by means of a resistor 47 and with the other terminal of the battery 32 by means of a resistor 48. The resistance of the resistor 47 is considerably lower than that of the resistor 37. When the voltage of the battery 32 falls below the threshold value set by the resistor 45, the transistor 46 becomes conducting and the resistor 47 is placed operatively in the loading circuit of the condenser 35. As a result the time constant of this circuit is essentially decreased, so that the full voltage accrues at the condenser 35 immediately after the transistor 34 is locked and the signaling lamp 23 is switched on by means of the transistor 36. In this way the signaling lamp 23 lights up in the rhythm of the switch 20, 21, 22 upon an undue decrease of the battery voltage.

The transistors cited by way of example may be replaced by electronic valves, relays or other amplifiers or circuit elements respectively.

While we have disclosed several embodiments of the present invention, it is to be understood that these embodiments are given by example only and not in a limiting sense.

We claim:
1. In a cinematographic camera of the type having a chamber for receiving a film cartridge, the combination comprising
   a film driving mechanism comprising motor means and gear means,
   driving means provided within said chamber for transporting the film within said cartridge,
   said driving means being operatively connected with said driving mechanism,
   release means operatively controlling said film driving mechanism and upon actuation thereof actuating the latter,
   film motion sensing means,
   impulse generating means controlled by said sensing means to generate impulses periodically dependent on the motion of the film within said cartridge,
   an electric circuit comprising,
      switch means operated by said release means, said switch means having an energizing and a de-energizing position,
      said release means moving said switch means to its energizing position upon actuation of said release means,
      alternating current transmitting means connecting said impulse generating means,
      control means operatively controlled by the alternating current impulses provided by said impulse generating means,
      condenser means operatively connected to said control means, said control means for changing the charge value of said condenser means in rhythm with said impulses, thereby varying the voltage on said condenser means dependent on the impulse frequency,
      voltage checking means operatively connected to said condenser means for checking the voltage on said condenser means, and
      signal means controlled by said voltage checking means and being actuated when said voltage differs from a preset voltage range due to an impulse frequency falling below a minimum frequency.

2. In a cinematographic camera, as set forth in claim 1, wherein said film motion sensing means is connected with said driving means.

3. In a cinematographic camera of the type having a chamber for receiving a film cartridge, the combination comprising
   an electric motor,
   a film driving mechanism comprising gear means driven by said electric motor,
   driving means provided within said chamber to transport the film within said cartridge,
   said driving means being connected with said driving mechanism,
   release means controlling said film driving mechanism and upon actuation thereof actuating said film driving mechanism,
   film motion sensing means,
   impulse generating means controlled by said sensing means to generate impulses periodically dependent on the motion of the film within said cartridge,
   an electric circuit comprising,
      switch means operated by said release means, said switch means having an energizing and a de-energizing position, and upon actuation of said release means for moving said switch means to its energizing position to energize said motor,
      alternating current transmitting means connecting said impulse generating means,
      control means operatively controlled by the alternating current impulses provided by said impulse generating means,
      condenser means operatively connected to said control means, said control means for changing the charge value of said condenser means in rhythm with said impulses, thereby varying the voltage on said condenser means dependent on the impulse frequency,
      voltage checking means operatively connected to said condenser means for checking the voltage on said condenser means, and for controlling said switch means to move the latter to its de-energizing position when said voltage differs from a preset voltage range due to an impulse frequency falling below a minimum frequency.

4. In a cinematographic camera, as set forth in claim 1, wherein
   said motor means comprises an electric motor connected in said circuit,
   a current source for said motor,
   a discharge resistor connected in parallel to said condenser means,
   said control means for periodically connecting said condenser means with said current source, and
   said signal means being actuated when the voltage on said condenser means falls below said preset value due to a decrease of the impulse frequency as well as due to a decrease of the voltage of the current source respectively.

5. In a cinematographic camera, as set forth in claim 1, further comprising
   a resistor operatively connected in the circuit to said condenser means defining therewith a time constant exceeding the period of the impulses of said impulse generating means,
   a source of current operatively connected to said circuit,
   said control means comprises a voltage dependent circuit operatively connected with said condenser means varying the resistance in the circuit of the condenser means and reducing said time constant when the voltage of said current source falls below a predetermined minimum operation voltage, the voltage on said condenser means fluctuating synchronously with the rhythm of said impulses from said impulse generating means, and
   said signal means for providing periodical signals upon actuation.

6. In a cinematographic camera of the type having a chamber for receiving a film cartridge, the improvement comprising
   a film driving mechanism comprising motor means and gear means,
   driving means provided within said chamber for transporting the film within said cartridge,
   said driving means being operatively connected with said driving mechanism,
   release means operatively controlling said film driving mechanism and upon actuation thereof actuating the latter,
   film motion sensing means,
   an impulse switch means operated by said sensing means and providing impulses,
   a direct current source,
   a first amplifier disposed across said current source having a first amplifier input and a first amplifier output,
   a first condenser operatively connected to said first amplifier,
   said impulse switch means operatively connected to said first amplifier and upon operation periodically operatively connecting said direct current source with interposition of said first condenser with said first amplifier input,
   a second condenser,
   a resistor connecting said second condenser with said direct current source effecting charging of said second condenser, said first amplifier output including output terminals connected with said second condenser to discharge the latter synchronously with said impulses provided by said impulse switch, a second amplifier having second amplifier input terminals and second amplifier output terminals, said second amplifier input terminals are connected with said second condenser, and signal means connected with said second amplifier output terminals for providing a signal when the voltage on said second condenser exceeds a predetermined value due to the frequency of the impulses falling below a preset value.

7. In a cinematographic camera, as set forth in claim 1, further comprising
a viewfinder, and
said signal means comprises a lamp disposed in the path of said viewfinder.

8. In a cinematographic camera, as set forth in claim 1, further comprising
a current source,
a selector switch means and a voltage depending circuit energized by said current source, and
said selector switch means for changing the signal means over to said voltage depending circuit in the circuit of said current source, releasing a signal when the voltage of said current source is at least equal to the minimum voltage of operation.

9. In a cinematographic camera, as set forth in claim 8, wherein
said signal means comprises a lamp,
at least one adjustable color filter positioned in front of said lamp, and
the setting of said color filter being controlled by said selector switch means, so that in case of voltage testing said lamp appears in a different color from that of normal operation.

10. In a cinematographic camera, as set forth in claim 6, further comprising
a voltage depending circuit means energized by said direct current source,
a selector switch means operatively connected to said first amplifier input and to said voltage depending circuit,
said selector switch means for operatively connecting upon operation said voltage depending circuit means with said first amplifier input,
said voltage depending circuit means for locking said first amplifier when the voltage of said current source is at least equal to a predetermined value, causing an increase of the voltage on said second condenser and releasing of a signal by said signal means.

References Cited

UNITED STATES PATENTS

| | | | |
|---|---|---|---|
| 2,971,432 | 2/1961 | Blank | 352—171 |
| 3,175,222 | 3/1965 | Nerwin | 352—72 |
| 3,205,507 | 9/1965 | Hochstein | 352—171 |

NORTON ANSHER, Primary Examiner

M. H. HAYES, Assistant Examiner

U.S. Cl. X.R.

116—114.10; 352—171